United States Patent [19]

Ikeda et al.

[11] 4,404,075
[45] Sep. 13, 1983

[54] RADIATION CURABLE COATING COMPOSITION COMPRISING THREE OR MORE (METH) ACRYLOYL POLYFUNCTIONAL MONOMER, PHENOL NOVOLAK EPOXY (METH) ACRYLATE OLIGOMER, AND A PHOTOINITIATOR

[75] Inventors: Junji Ikeda, Ikoma; Keizi Saeki, Kadoma; Tamotsu Wakahata, Katano; Takao Inoue, Hirakata, all of Japan

[73] Assignee: Matsushita Electric Industrial Co., Ltd., Japan

[21] Appl. No.: 445,472

[22] Filed: Nov. 30, 1982

Related U.S. Application Data

[63] Continuation-in-part of Ser. No. 174,600, Aug. 1, 1980, abandoned.

[30] Foreign Application Priority Data

Aug. 1, 1979 [JP] Japan .................................. 54-98942

[51] Int. Cl.³ .......................... C08F 2/00; C09D 3/72
[52] U.S. Cl. .......................... 204/159.23; 204/159.15; 525/531
[58] Field of Search .................. 525/531; 204/159.15, 204/159.23

[56] References Cited

U.S. PATENT DOCUMENTS

| | | | |
|---|---|---|---|
| 3,673,140 | 6/1972 | Ackerman et al. | 204/159.15 |
| 3,674,545 | 7/1972 | Strolle | 525/531 |
| 3,992,477 | 11/1976 | Dickie et al. | 204/159.15 |
| 4,014,771 | 3/1977 | Rosenkranz et al. | 204/159.23 |
| 4,040,925 | 8/1977 | McGinniss | 204/159.23 |
| 4,081,492 | 3/1978 | Traenckner et al. | 504/159.23 |
| 4,092,173 | 5/1978 | Novak et al. | 204/159.23 |
| 4,199,421 | 4/1980 | Kamada et al. | 204/159.23 |
| 4,205,018 | 5/1980 | Nagasawa et al. | 204/159.15 |
| 4,237,216 | 12/1980 | Skarvinko | 204/159.15 |

FOREIGN PATENT DOCUMENTS 1198159 6/1967 United Kingdom .
1448643 9/1976 United Kingdom .

OTHER PUBLICATIONS

Derwent Abst. 16362 V/09 12-24-73 Japan Oil Seal J48102889.
Chem. Abst. 84-128794 (1976) Abolafia et al. DT 2459179 IBM Jun. 26, 1975 "Photosensitive Coatings".
Chem. Abst. 83-18129(g) (1975) Rosenkranz et al. DT234979 Apr. 17, 1975.
Chem. Abst. 83-117221 (1975) Nishikubo et al. J7529690 Japan Oil, Mar. 25, 1975.
Chem. Abst. 84-165851(a) Embossed Molding Asano et al. Japan 7600558 Jan. 6, 1976.
Chem. Abst. 79-54364w (1973) "Epoxy Resin Comp" Nishikubo et al. Jul. 27, 1971 Japan Kokai 73-22186.
Chem. Abst. 84-32741t (1976) Fritze et al. 9-4-75 PT2408893.

*Primary Examiner*—Melvyn I. Marquis
*Assistant Examiner*—Herbert J. Lilling
*Attorney, Agent, or Firm*—Wenderoth, Lind & Ponack

[57] ABSTRACT

There is provided a coating composition (B) consisting essentially of:
  a composition (A) and
  a photopolymerization initiating effective amount of a photoinitiator,
  said composition (A) containing:
   (i) 80 to 90% by weight of at least one polyfunctional monomer having three or more (meth)acryloyloxy radicals per molecule,
   (ii) 5 to 10% by weight of at least one acrylic monomer having two or less functional groups and
   (iii) 5 to 10% by weight of a phenol novolak epoxy (meth)acrylate oligomer of the formula:

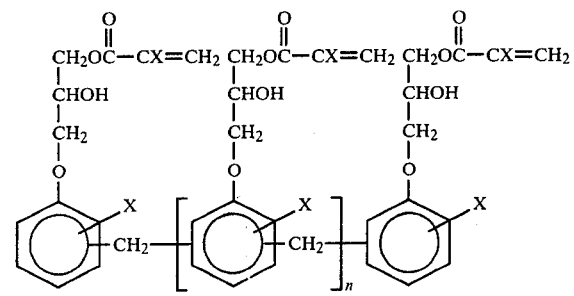

where,
X=H, CH₃,
X=H, CH₃, Br and
n=0–8 with the proportion of oligomer wherein n of 4≦n≦8 is more than 20 wt % with respect to the total amount of the novolak epoxy (meth)acrylate.

10 Claims, No Drawings

RADIATION CURABLE COATING COMPOSITION COMPRISING THREE OR MORE (METH) ACRYLOYL POLYFUNCTIONAL MONOMER, PHENOL NOVOLAX EPOXY (METH) ACRYLATE OLIGOMER, AND A PHOTOINITIATOR

This is a continuation-in-part application of Ser. No. 174,600, filed Aug. 1, 1980 now abandoned.

FIELD OF INVENTION

The present invention relates to a coating composition of improved surface hardness and heat resistance. These improved properties are due to the high cross-linking density and specific heat-resistant structure of the coating. The coating structure has a long, molecular chain and a large number of functional groups per molecule.

BACKGROUND OF THE INVENTION

The present invention relates to a coating composition which can be cured by an ultraviolet irradiating operation or the combination of the ultraviolet irradiating operation and a heating operation, and more particularly, to a composition with which a plastic molding or the other basic materials are coated and cured to form a protective film which is of improved surface hardness, scratch resistance and weather resistance.

Since the plastic molding is generally low in hardness, and inferior in abrasion resistance and scratch resistance, the molding is easily scratched and thus its transparency deteriorates. Among the plastic components used in electric products, containers and covers for electric cookers are scratched in use or when washed with a steel or nylon scrubbing-brush or the like, thus ruining their appearance and ability to be cleaned.

Furthermore, items such as transparent panels or covers for acoustic products are likely to be scratched during use. Accordingly, there is much room for improvement of these plastic components.

Among conventional protective coating compositions having the uses described above, there may be mentioned those containing organic silicone compounds, melamine compounds, etc. for application to the surface of base materials such as plastic moldings, etc. thereby to form a cured film. However, none of these known coating compositions can provide a pencil hardness of 7H or more.

In addition, these conventional coating compositions are inferior in weather resistance and abrasion resistance, thus providing unsatisfactory results. For example, one coating composition with good abrasion resistance forms a fragile protective film and is easy to crack, while crack prevention results in inferior abrasion and scratch resistance. Also, these known compositions are of the heat curing type, wherein a longer time is required to cure the compositions, and the coated compositions may be deformed and deteriorated due to the heating operation. Moreover, stable films of satisfactory hardness have not been obtained. Additionally, the pot life of these conventional compositions is often too short.

Accordingly, an object of the present invention is to provide a coating composition of such characteristics as described hereinabove which can eliminate the disadvantages inherent in the conventional ones.

BRIEF SUMMARY OF THE INVENTION

The coating composition of the present invention consists essentially of:
(i) 80 to 90% by weight of at least one polyfunctional monomer having three or more (meth)acryloyloxy groups per molecule,
(ii) 5 to 10% by weight of at least one acrylic monomer having 2 or less functional groups and
(iii) 5 to 10% by weight of an epoxy (meth)acrylate oligomer of the formula:

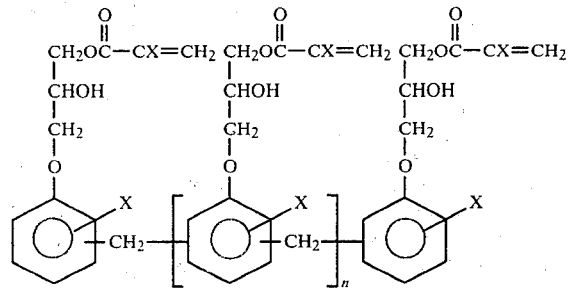

where,
X=H, CH$_3$,
X=H, CH$_3$, Br and
n=0–8,
with the proportion of oligomer wherein n of $4 \leq n \leq 8$ being more than 20 wt% with respect to the total amount of the novolak epoxy (meth)acrylate.

This composition also includes a photo-initiator.

The coating composition of this invention is applied to the surfaces of plastic constructions to retain the characteristics of the plastic construction in terms of abrasion resistance, weather resistance, etc. Therefore, the present invention provides a quickly curable coating composition which can form a film superior in surface hardness, weather resistance, adherence, transparency or the like by performing a coating operation on the base material to cure it. The coating operation is performed directly on the base material by a coating method normally performed or is performed after proper prior treatment. The composition is cured by ultraviolet irradiation at approximately room temperature, or by heating to heat resistant temperature or less or by the combination of ultraviolet irradiation and heating. A film which exhibits excellent properties can be formed in an extremely short time.

The foregoing object and other objects, features, aspects and advantages of the present invention will become more apparent from the following detailed description of the present invention when taken in conjunction with the accompanying embodiments.

DETAILED DESCRIPTION

As indicated above, the present invention provides an improved coating composition which comprises three essential components, namely, the polyfunctional monomer having three or more (meth)acryloyloxy groups per molecule, at least one acrylic monomer having two or less functional groups and an epoxy (meth)acrylate oligomer of specific structure and functional groups.

In addition, the inventive composition contains a photo-initiator and if desired, other additional components such as solvents, viscosity modifiers etc., depending on the intended use.

With regard to the epoxy (meth)acrylate oligomer component, it is represented by the formula:

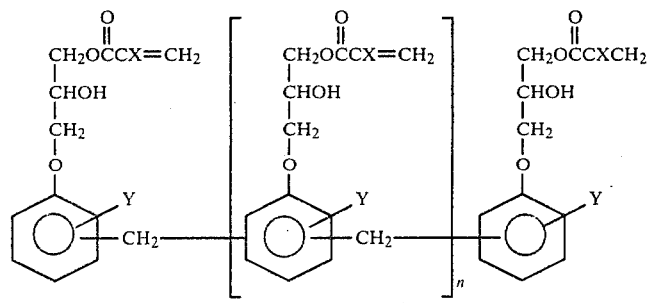

wherein
Y is hydrogen, methyl or bromine,
X is hydrogen or methyl group and
n is 0 to 8. However, at least 20% of the total amount of this component must have n=4–8.

Examples of this component include phenol novolak epoxide (meth)acrylates, cresol novolak epoxide (meth)acrylates and bisphenol A epoxide (meth)acrylate resins.

In the case of phenol novolak epoxy (meth)acrylates, it is preferred that $4 \leq n < 6$. If $n < 4$, there is a problem in the flexibility of the coating film, while at $7 \leq n$, it becomes difficult to dilute with an alcoholic solvent.

In the case of cresol novolak epoxy (meth)acrylates, the proper realtion is $4 \leq n \leq 8$. If $n < 4$, the flexibility of the coating film presents some problems, while difficulty in dissolving in the alcoholic solvents may result, if $n > 8$.

The n value of the above novolak epoxy (meth)acrylate is determined by styrene conversion in gel permeation chromotography.

It is desirable that the above-discussed oligomers have a molecular weight of less than 10,000.

If the phenol novolak epoxy (meth)acrylate oligomer is employed at greater than 5% of the composition, the flexibility and adhesion of the composition is improved. However, at greater than 10%, the viscosity of the coating is undesirably raised, thus making it impossible to form a thin film of less than 10 microns in thickness.

With regard to the polyfunctional monomer component having 3 or more meth(acryloyloxy) groups per molecule, the function of this component is to improve the cross-linking density of the composition. Suitable examples include trimethylolpropanetri (meth)acrylates, dipentaerythritoltri (meth)acrylates, dipentaerythritolhydroxytetra (meth)acrylates and epoxy (meth)acrylates. This component comprises 80 to 90% by weight of the polymerizable portion of the composition.

It is especially perferred to employ dipentaerythritolhydroxytetra (meth)acrylate or trimethylolpropanetri(meth)acrylate or both in the ratio of 80/20 to 0/100 by weight.

With regard to the acrylic monomer component having two or less functional groups, there may be mentioned alkyl, cycloalkyl, glycyzirtetrahydrofurfuryl, allyl, hydroxy alkyl, alkylene glycol, polyoxyalkylene glycol, trimethylol propane, pentaerythritol or urethane mono- or di(meth)acrylates. These are employed at 5 to 10% by weight of the polymerizable portion of the composition. If this component is present at more than 10%, sufficient surface hardness cannot be obtained.

As polymerization initiators, there may be employed photo-polymerization initiators alone or combined with heat-polymerization initiators. As examples of photo-polymerization initiators, there may be enumerated one or more of benzoin, benzoin alkyl ethers, substituted benzoins, arthraquinone, alkyl substituted anthraquinones, benzyl, benzophenones, triphenylphosphines, dibenzylketones, or the like. As heat-polymerization initiators there may be enumerated one or more of organic peroxides such as benzoin peroxide, methyl ethyl ketone peroxide, t-butyl hydroperoxide, cumene hydroperoxide, dicumyl peroxide, t-butyl peroxide benzoate or the like or azo compounds such as azobisisobutyronitrile or the like. Also, the heat-polymerization initiators function as cure promoting agents for the photo-polymerization initiators when the heat-polymerization initiator is used together with the photo-polymerization initiator.

Of the above photo-initiators, benzoin isopropyl ether is particularly effective in providing a coating film having excellent resistance against thermal impact and having excellent adhesion.

The viscosity of the composition can be lowered in accordance with the intended use by the addition of suitable organic solvents. As examples of solvents useful for lowering the viscosity, one or more of alcohols, ketones, ethers, esters or the like can be used. For example, ethyl alcohol, acetone, toluene, xylene or the like can be used depending on the base material. However, acetone or the like is not suitable for acrylic resin and AS resins, but mixed solvents such as ethyl alcohol, isopropyl alcohol, toluene or the like are particularly preferred. Also, alcoholic solvents are particularly suitable for styrene and polycarbonate resins.

The ultraviolet ray generating source used for curing the coating composition is the same as that used for conventional ultraviolet curable compositions, e.g. sunlight, low-pressure mercury-arc lamps, medium-pressure mercury-arc lamps, high-pressure mercury-arc lamps, superhigh-pressure mercury-arc lamps, arc lamps, xenon lamps or the like may be enumerated. Also, as the heating source for heat curing the composition, a hot air blast, nichrome heater wire, infrared ray lamp, far infrared ray heater or the like may be enumerated.

To improve the storage stability, compounds such as p-benzoquinone, hydroquinone, catechol, p-methoxy phenol or the like can be used as reaction inhibitors.

To provide thixotropic properties, the generally known method of adding a small amount of thixotropic filler may be employed.

To coat the coating composition, normally practised methods of dipping, spray flow coating, etc. can be adopted.

In the present invention, cobalt naphthenate, manganese naphthenate, amines, p-toluene sulfonamide, etc. may be included as cure promoting agents when required. Also, bubble removing agents, viscosity increasing agents or the like can be added when required.

As indicated above, the composition is desirably in an alcoholic solvent and is desirably applied to substrates such as acrylics, polycarbonates, acrylnitriles, styrols etc. The presence of the coating provides excellent surface hardness to these resins, prevents whiteish scratching and the like and permits close adhesion without initial treatment by a primer. Further, the coating has excellent resistance to boiling water.

The present invention will now be more specifically explained in connection with the following Examples.

EXAMPLES 1 THROUGH 6

In these examples, and in following Table 1, a phenol novolak type epoxy acrylate having a molecular weight of 10,000 less is employed as component (a), which is an epoxy acrylate included within products of types Nos. R-246, R-245, R-140 all manufactured by the Nippon Kayaku Kabushiki Kaisha of Japan, trimethylolpropane triacrylate is employed as component (b), hydroxyethyl methacrylate is employed as component (c) and benzoin isopropyl ether is employed as component (d).

These components were mixed in the given amounts and were repeatedly mixed and stirred for 30 minutes in a melting operation in an oil bath at 80° C.

(1) Adherence between the coated film and the molding.

One hundred cloth patches each being 1 mm. square were cut with a knife of sharp blade edge. Cellophane adhesive tape was strongly pressed onto the coating and then was forcibly peeled from the coated film to measure the film adherence. The adherence is represented in three stages A, B and C in order of quality.

(2) Pencil hardness

A pencil hardness measuring instrument was used for measuring the pencil hardness of the coated film with the load being 1000 g.

(3) Scratch resistance

The face of the coated film was scrubbed with steel wool to show, in three stages, how the coated face was scratched.

A: No scratches are provided by a strong scrubbing operation.

B: Some scratches are provided by a strong scrubbing operation.

C: The coated face is remarkably injured.

(4) Weather resistance

The changes in characteristics of the coated film were checked after the coated products were left to chance for forty-eight hours in the weather meter. Also, the results in Tables 1 and 2 obtained by application of the coating material on the acrylic base plate and after 30 minutes' irradiation by a high-pressure ultraviolet lamp 12 m W/cm².

TABLE 1

| EXAMPLES No. | Coating Composition | | | | Test Results | | | |
|---|---|---|---|---|---|---|---|---|
| | Component (a) | Component (b) | Component (c) | Component (d) | Adherence | Pencil Hardness | Scratch Resistance | Weather Resistance |
| 1 | | 100 parts | | 5 parts | C | 9H | A | — |
| 2 | | | 100 parts | 5 parts | A | 3H | C | — |
| 3 | 100 parts | | | 5 parts | A | 4H | C | — |
| 4 | | 50 parts | 50 parts | 5 parts | B | 6H | B | — |
| 5 | 5 parts | 90 parts | 5 parts | 5 parts | A | 9H | A | no changes |
| 6 | 10 parts | 80 parts | 10 parts | 5 parts | A | 9H | A | no changes |

TABLE 2

| EXAMPLES No. | Coating Composition | | | Test Results | | | |
|---|---|---|---|---|---|---|---|
| | Embodiment No. 6 | Solvent | Coated Base Plate | Adherence | Pencil Hardness | Scratch Resistance | Weather Resistance |
| 7 | 70 parts | 30 parts | acryl | A | 9H | A | no changes |
| 8 | 70 parts | 30 parts | AS | A | 7H | A | no changes |
| 9 | 50 parts | 50 parts | acryl | A | 6H | B | no changes |
| 10 | 50 parts | 50 parts | AS | A | 4H | C | no changes |

The coating composition obtained was applied to an acrylic plate and the test results provided by the specified test method as mentioned hereinbelow are given in Table 1.

EXAMPLES 7 THROUGH 10

In these examples 7 through 10 listed in Table 2, a given amount of isopropyl alcohol was added as organic solvent to the coating composition of the Embodiment 6 to decrease the viscosity. Thereafter, it was applied on an acrylic base plate (pencil hardness 4H) and an AS base plate (pencil hardness 2H). The test results in terms of pencil hardness, scratch properties and adherence are shown in Table 2.

The coated products listed within Tables 1 and 2 were measured in physical properties of adherence, pencil hardness, scratch resistance and weather resistance by the following methods.

The results of Tables 1 and 2 show that the coated films of Examples which have been cured by irradiation with ultraviolet rays for a given period of time are hard to scratch, even if the films are washed with a steel-scrubbing brush, a nylon brush or the like thus keeping their original fine appearance. Also, since the organic peroxide or the like is not present as a polymerization initiator in each of the Examples, a coating film is provided which is superior in terms of food sanitation. As apparent from these Examples, the compositions, where are well balanced in characteristics, e.g. A in adherence, 7H or more in pencil hardness, A in scratch resistance, no change in weather resistance, etc., and are superior in characteristics, are provided in Examples 5 and 6. The compositions of Examples 5 and 6 contain, respectively, the polyfunctional monomer component having 3 or more (meth)acryloyloxy groups at 80 to 90% by weight, the acrylic monomer having two or less functional groups per molecule at 5 to 10% by weight and the phenol novolak epoxy (meth)acrylate component at 5 to 10% by weight.

Although, in the present Examples, the acrylate base plate and the AS base plates were used in the tests, many materials such as plastics, wood, etc. can also be employed. Also, the heat-polymerization initiator can be jointly used to form the coating film, for an extremely short time, on complicated shapes. In addition, the coating compositions of the present invention can be reduced in viscosity, and a film of several micrometers can be produced merely by a dip coating operation.

The present invention provides a quickly cured coating composition which can form a film superior in surface hardness, weather resistance, adherence, transparency or the like by coating a base material and curing it. The coating of the composition is performed directly on the base material by a coating method normally performed or is performed after proper prior treatment, while the composition is cured by irradiation with ultraviolet rays at approximately room temperature, is cured through heating to a heat resistant temperature or lower or is cured by the combination of the ultraviolet irradiation and the heating, and, also, a film which is capable of initial coating performance can be formed in an extremely short time.

Although the present invention has been described and illustrated in detail, it is clearly understood that the same is by way of illustration and example only and is not to be taken by way of limitation, the spirit and scope of the present invention being limited only by terms of the appended claims.

We claim:

1. A coating composition (B) consisting essentially of: a composition (A) and
a photopolymerization initiating effective amount of a photoinitiator,
said composition (A) containing:
  (i) 80 to 90% by weight of at least one polyfunctional monomer having three or more (meth)acryloyloxy radicals per molecule,
  (ii) 5 to 10% by weight of at least one acrylic monomer having two or less functional groups and
  (iii) 5 to 10% by weight of a phenol novolak epoxy (meth)acrylate oligomer of the formula:

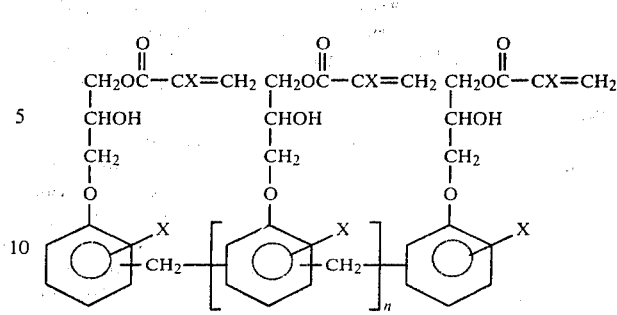

where,
X=H, CH$_3$,
X=H, CH$_3$, Br and
n=0–8
with the proportion of oligomer wherein n of $4 \leq n \leq 8$ is more than 20 wt% with respect to the total amount of the novolak epoxy (meth)acrylate.

2. The coating composition of claim 1, wherein said photoinitiator is a benzoin.

3. The coating composition of claim 2, wherein the benzoin is benzoin isopropyl ether.

4. The coating composition of claim 3, wherein the benzoin isopropyl ether is employed at 5 parts by weight per 100 parts of composition (A).

5. The coating composition of claim 1, wherein the molecular weight of said oligomer is 10,000 or less.

6. The coating composition of claim 1, wherein said coating composition (B) is mixed with an alcoholic solvent.

7. The coating composition of claim 1, wherein said polyfunctional monomers (i) are one or more of trimethylolpropanetriacrylate, dipentaerythritolhydroxytetraacrylate and epoxide acrylate.

8. The coating composition of claim 7, wherein said polyfunctional (meth)acrylate (i) is dipentaerythritolhydroxytetra (meth)acrylate or trimethylolpropanetri (meth)acrylate in a ratio of 80/20 to 0/100.

9. The coating composition of claim 1, wherein said acrylic monomers (ii) contain one or more (meth)acrylic acid or mono- or di-(meth)acrylic ester groups.

10. The coating composition of claim 9, wherein said mono- or di-(meth)acrylates are alkyl, cycloalkyl, glycyzirtetrahydrofurfuryl, alkyl, hydroxyalkyl, alkylene glycol, polyoxyalkylene glycol, trimethylolpropane, pentaerythritol, or urethane mono- or di-(meth)acrylates.

* * * * *